(12) United States Patent
Baklaian

(10) Patent No.: US 7,056,070 B2
(45) Date of Patent: Jun. 6, 2006

(54) JEWELRY SETTING/PRESETTING TOOL

(76) Inventor: Dimitre K. Baklaian, 62-36 81st St., Middle Village, NY (US) 11379

( * ) Notice: Subject to any disclaimer, the term of this patent is extended or adjusted under 35 U.S.C. 154(b) by 336 days.

(21) Appl. No.: 10/644,177

(22) Filed: Aug. 21, 2003

(65) Prior Publication Data
US 2005/0042047 A1 Feb. 24, 2005

(51) Int. Cl.
B28D 5/00 (2006.01)
B28D 5/02 (2006.01)

(52) U.S. Cl. .................... 408/111; 408/135
(58) Field of Classification Search ............ 408/103, 408/110, 111, 135, 136; 29/10; 269/71.3; 63/DIG. 55; B28D 5/00, 5/02
See application file for complete search history.

(56) References Cited

U.S. PATENT DOCUMENTS 1,563,887 A * 12/1925 Wiespetat ............ 408/135
4,295,640 A * 10/1981 Merrell ............... 269/47
4,726,273 A * 2/1988 Miceli ................ 83/629
5,051,044 A * 9/1991 Allen ................. 408/92
6,280,123 B1 * 8/2001 Gill .................. 408/76

* cited by examiner

Primary Examiner—Boyer D. Ashley
Assistant Examiner—Sara Addisu

(57) ABSTRACT

A jewelry setting/presetting tool for drilling countersink basins in jewelry and setting stones therein. The jewelry setting/presetting tool includes a bracket assembly including a board-like mounting bracket having an opening being disposed therethrough from a topside to a bottom side thereof; and also includes a tubular base member being secured in the opening of the board-like mounting bracket and having an open bottom end and an open top end; and further includes a work-piece support member being adjustably fastened in the tubular base member through the open bottom end thereof; also includes a tool support member being movably disposed in the tubular base member; and further includes a working tool assembly being securely and removably fastened to the tool support member; and also includes a means of moving the tool support member and the working tool assembly in the tubular base member.

11 Claims, 3 Drawing Sheets

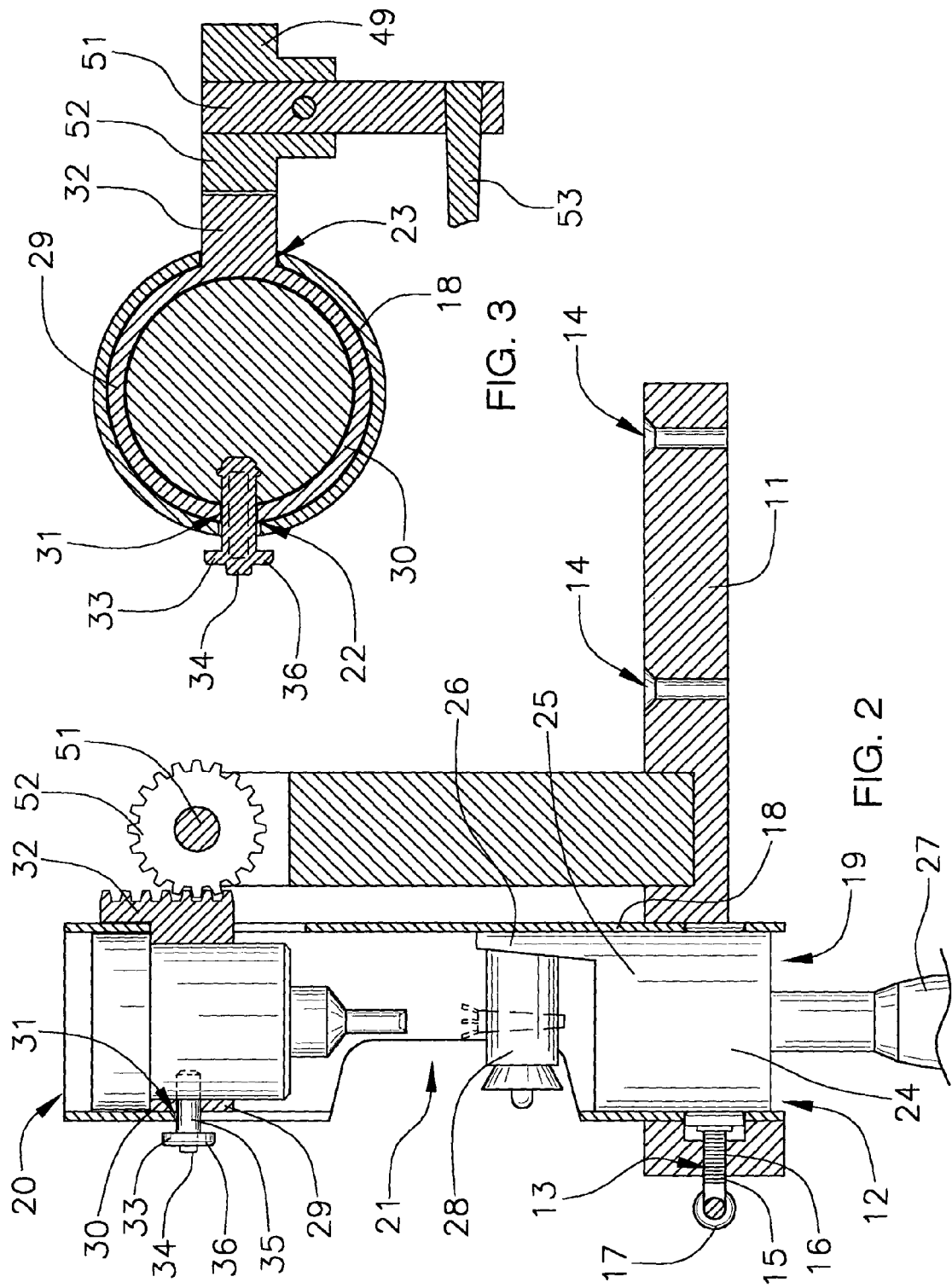

JEWELRY SETTING/PRESETTING TOOL

BACKGROUND OF THE INVENTION

1. Field of the Invention

The present invention relates to stone setting/presetting tools and more particularly pertains to a new jewelry setting/presetting tool for drilling countersink basins in jewelry and setting stones therein.

2. Description of the Prior Art

The use of stone setting/presetting tools is known in the prior art. More specifically, stone setting/presetting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,888,031; U.S. Pat. No. 5,449,317; U.S. Pat. No. 4,750,245; U.S. Pat. No. 1,546,814; U.S. Pat. No. 711,560; and U.S. Pat. No. Des. 257,679.

While these devices fulfill their respective, particular objectives and requirements, the aforementioned patents do not disclose a new jewelry setting/presetting tool. The prior art includes vices and drills mounted to work benches for drilling and setting stones in jewelry.

SUMMARY OF THE INVENTION

The general purpose of the present invention, which will be described subsequently in greater detail, is to provide a new jewelry setting/presetting tool which has many of the advantages of the stone setting/presetting tools mentioned heretofore and many novel features that result in a new jewelry setting/presetting tool which is not anticipated, rendered obvious, suggested, or even implied by any of the prior art stone setting/presetting tools, either alone or in any combination thereof. The present invention includes a bracket assembly including a board-like mounting bracket being adapted to fasten to a bench or the like and having an opening being disposed therethrough from a topside to a bottom side thereof; and also includes a tubular base member being secured in the opening of the board-like mounting bracket and having an open bottom end and an open top end; and further includes a work-piece support member being adjustably fastened in the tubular base member through the open bottom end thereof; also includes a tool support member being movably disposed in the tubular base member; and further includes a working tool assembly being securely and removably fastened to the tool support member for setting and presetting jewelry; and also includes a means of moving the tool support member and the working tool assembly in the tubular base member for presetting and setting a stone in the work-piece. None of the prior art includes the combination of elements of the present invention.

There has thus been outlined, rather broadly, the more important features of the jewelry setting/presetting tool in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new jewelry setting/presetting tool which has many of the advantages of the stone setting/presetting tools mentioned heretofore and many novel features that result in a new jewelry setting/presetting tool which is not anticipated, rendered obvious, suggested, or even implied by any of the prior art stone setting/presetting tools, either alone or in any combination thereof.

Still another object of the present invention is to provide a new jewelry setting/presetting tool for drilling countersink basins in jewelry and setting stones therein.

Still yet another object of the present invention is to provide a new jewelry setting/presetting tool that is easy and convenient to set up and use.

Even still another object of the present invention is to provide a new jewelry setting/presetting tool that simplifies the task of presetting the jewelry for the setting of stones therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a longitudinal cross-sectional view of the present invention.

FIG. 3 is a lateral cross-sectional view of the present invention.

DESCRIPTION OF THE PREFERRED EMBODIMENT

Figure 1:
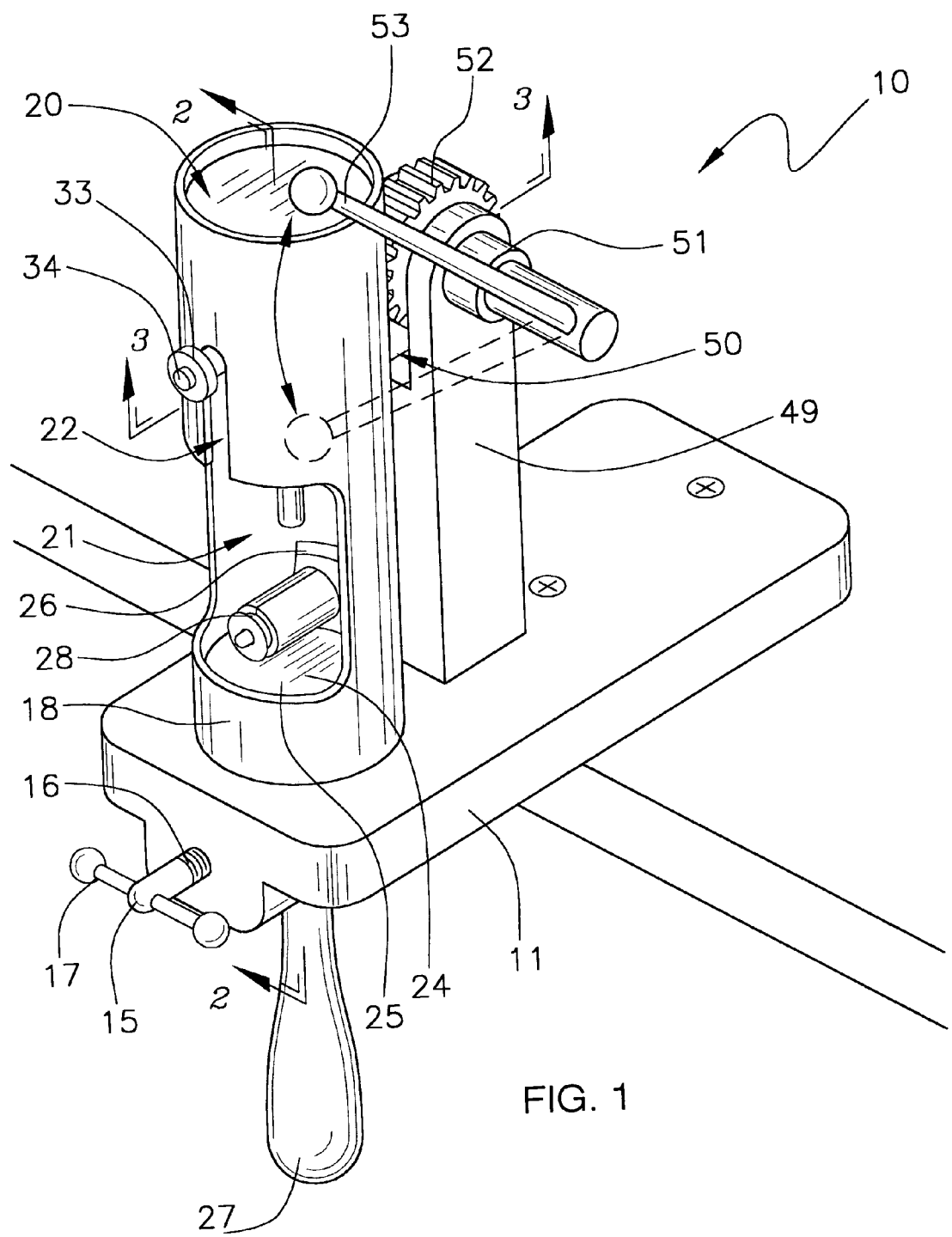
FIG. 1 is a perspective view of a new jewelry setting/presetting tool according to the present invention.
Figure 4:
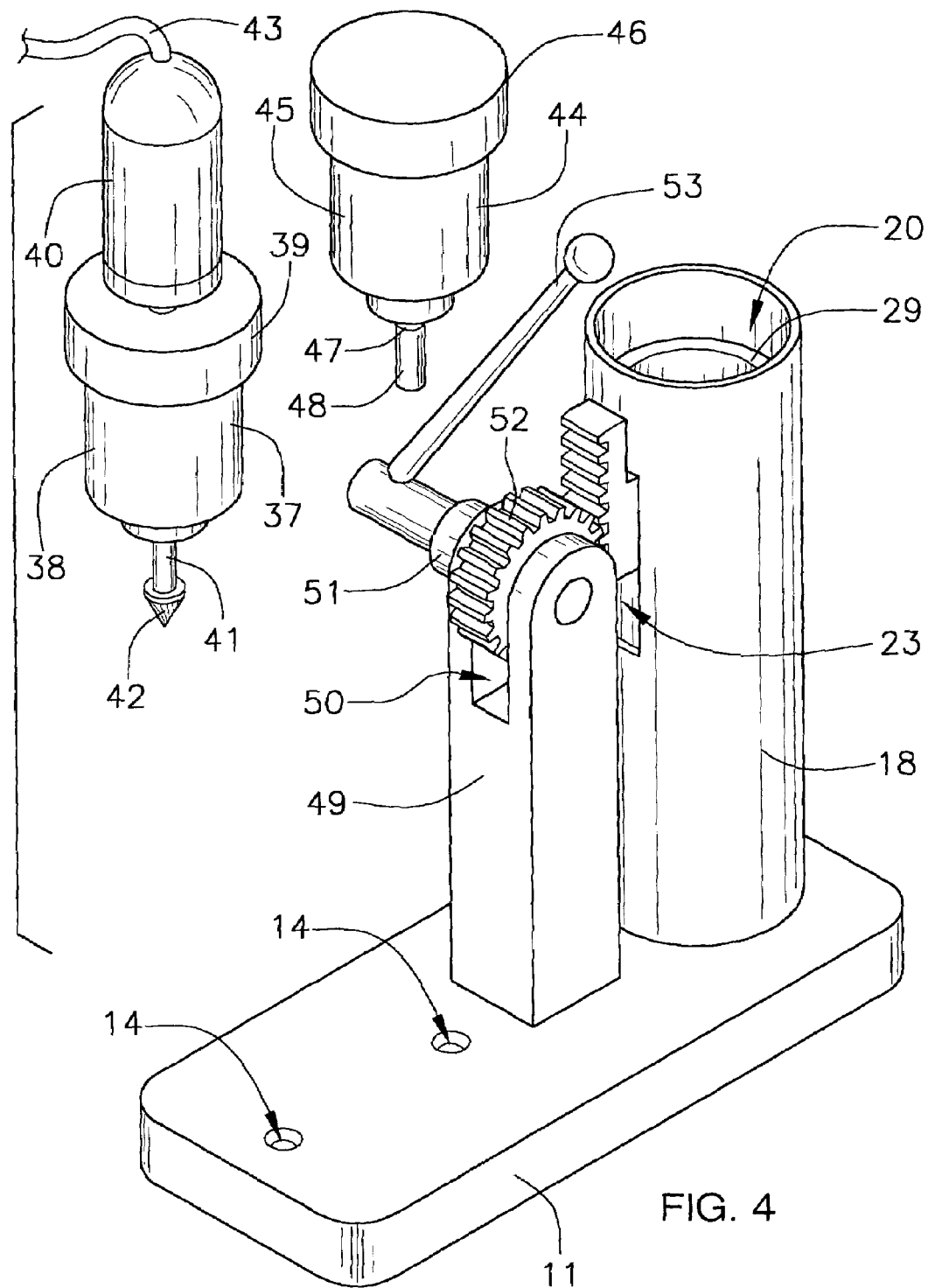
FIG. 4 is a partial exploded perspective view of the present invention.

With reference now to the drawings, and in particular to FIGS. 1 through 4 thereof, a new jewelry setting/presetting tool embodying the principles and concepts of the present invention and generally designated by the reference numeral 10 will be described.

As best illustrated in FIGS. 1 through 4, the jewelry setting/presetting tool 10 generally comprises a bracket assembly including a board-like mounting bracket 11 being adapted to fasten to a bench or the like and having an opening 12 being disposed therethrough from a topside to a bottom side thereof. The board-like mounting bracket 11 further includes a threaded bore 13 being disposed in an end wall thereof and being disposed in the opening 12 thereof, and also includes bench-mounting holes 14 being disposed therethrough and being adapted to receive fasteners for fastening the board-like mounting bracket 11 to the bench or the like. The bracket assembly also includes an elongate fastening member 15 being threaded through the threaded bore 13 of the board-like mounting bracket 11 and having a threaded shaft 16 and a handle 17.

A tubular base member 18 is conventionally secured in the opening 12 of the board-like mounting bracket 11 and has an open bottom end 19 and an open top end 20. The tubular base member 18 further has an opening 21 being disposed through a wall thereof, and also has a first longitudinal slot 22 being disposed through the wall and through an upper edge forming the opening 21 of the tubular base member 18, and further has a second longitudinal slot 23 being disposed through the wall and being diametrically-opposed to the first longitudinal slot 22.

A work-piece support member 24 is adjustably fastened in the tubular base member 18 through the open bottom end 19 thereof. The work-piece support member 24 includes a cylindrical member 25 which is securely engaged with the elongate fastening member 15 in the tubular base member 18 and having an extension wall 26 integrally extending outwardly from a top of the cylindrical member 25, and also includes a handle member 27 being conventionally attached to a bottom of the cylindrical member 25 for moving the cylindrical member 25 in the tubular base member 18, and further includes a work-piece holder 28 being conventionally attached to the extension wall 26 and being spaced above the top of the cylindrical member 25.

A tool support assembly is movably disposed in the tubular base member 18. The tool support assembly includes a tool support member 29 being movably disposed in an upper portion of the tubular base member 18, and also includes a locking pin 33 being biasedly disposed through the tool support member 29 and being slidably disposed in the first longitudinal slot 22 of the tubular base member 18. The tool support member 29 includes a tubular portion 30 and a toothed bar portion 32 being movably disposed through the second longitudinal slot 23 of the tubular base member 18 with the locking pin 33 being disposed through a hole 31 in a wall of the tubular portion 30 of the tool support member 29. The locking pin 33 includes a shaft 34, a sleeve 35 being disposed about the shaft 33, and a collar 36 being conventionally disposed about an end of the sleeve 35.

A working tool assembly is securely and removably fastened to the tool support member 29 for setting and presetting jewelry. The working tool assembly includes a drill assembly including a drill support member 37 being securely fastened with the locking pin 33 in the tubular portion 30 of the tool support member 29, and also includes a drill having a motor 40 and a rotatable shaft 41 being conventionally disposed through the drill support member 37, and further includes a countersink bit 42 being conventionally mounted to an end of the rotatable shaft 41, and also includes a power cord 43 being conventionally attached to the motor 40. The drill support member 37 is a cylindrical block 38 having an annular flange 39 being integrally disposed about a top end thereof. The working tool assembly also includes a setting bit support member 44 being securely fastened with the locking pin 33 in the tubular portion 30 of the tool support member 29, and also includes a shaft 47 being conventionally attached to a bottom end of the setting bit support member 44, and further includes a stone setting bit 48 being conventionally attached to an end of the shaft 47 for setting a stone in the work-piece. The setting bit support member 44 is a cylindrical block 45 having an annular flange 46 being integrally disposed about a top end thereof.

A means of moving the tool support member 29 and the working tool assembly in the tubular base member 18 for presetting and setting a stone in the work-piece includes a support column 49 being securely and conventionally mounted upon the board-like mounting bracket 11, and also includes an axle 51 being rotatably and conventionally mounted to the support column 49, and further includes a gear 52 being conventionally mounted to the axle 51 for rotation therewith and being engaged to the toothed bar portion 32 of the tool support member 29, and also includes a lever 53 being conventionally mounted to the axle 51 for the rotation of the gear 52. The support column 49 includes a longitudinal slot 50 being disposed in a top end thereof with the axle 51 being journaled through the longitudinal slot 50 and with the gear 52 being rotatably disposed in the longitudinal slot 50.

In use, the user conventionally mounts the work-piece which is a piece of jewelry upon the work-piece holder 28 and then inserts and fastens the drill assembly in the tubular portion 30 of the tool support member 29, and then energizes the motor 40 which turns the countersink bit 42. The user then moves the lever 53 to lower the countersink bit 42 onto the piece of jewelry to drill a basin therein. After which, the user removes the drill assembly and inserts and fastens the setting bit support member 44 in the tubular portion 30 of the tool support member 29, and then lowers the stone setting bit 48 onto the piece of jewelry with a stone being conventionally supported by the stone setting bit 48 and being set in the piece of jewelry.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the jewelry setting/presetting tool. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A jewelry setting/presetting tool comprising:
   a bracket assembly including a board-like mounting bracket being adapted to fasten to a bench and having an opening being disposed therethrough from a topside to a bottom side thereof, said board-like mounting bracket further including a threaded bore being disposed in an end wall thereof and being disposed in said opening thereof, and also including bench-mounting holes being disposed therethrough and being adapted to receive fasteners for fastening said board-like mounting bracket to the bench, said bracket assembly also including an elongate fastening member being threaded through said threaded bore of said board-like mounting bracket and having a threaded shaft and a handle;

a tubular base member being secured in said opening of said board-like mounting bracket and having an open bottom end and an open top end, said tubular base member further having an opening being disposed through a wail thereof, and also having a first longitudinal slot being disposed through said wall and through an upper edge forming said opening of said tubular base member, and further having a second longitudinal slot being disposed through said wall and being diametrically-opposed to said first longitudinal slot;

a work-piece support member being adjustably fastened in said tubular base member through said open bottom end thereof;

a tool support member being movably disposed in said tubular base member;

a working tool assembly being securely and removably fastened to said tool support member for setting and presetting jewelry; and a means of moving said tool support member and said working tool assembly in said tubular base member for presetting and setting a stone in the work-piece.

2. A jewelry setting/presetting tool as described in claim 1, wherein said work-piece support member includes a cylindrical member which is securely engaged with said elongate fastening member in said tubular base member and having an extension wall extending outwardly from a top of said cylindrical member, and also includes a handle member being attached to a bottom of said cylindrical member for moving said cylindrical member in said tubular base member, and further includes a work-piece holder being attached to said extension wall and being spaced above said top of said cylindrical member.

3. A jewelry setting/presetting tool as described in claim 2, wherein said tool support assembly includes a tool support member being movably disposed in an upper portion of said tubular base member, and also includes a locking pin being biasedly disposed through said tool support member and being slidably disposed in said first longitudinal slot of said tubular base member.

4. A jewelry setting/presetting tool as described in claim 3, wherein said tool support member includes a tubular portion and a toothed bar portion being movably disposed through said second longitudinal slot of said tubular base member, said locking pin being disposed through a hole in a wall of said tubular portion of said tool support member.

5. A jewelry setting/presetting tool as described in claim 4, wherein said locking pin includes a shaft, a sleeve being disposed about said shaft, and a collar being disposed about an end of said sleeve.

6. A jewelry setting/presetting tool as described in claim 5, wherein said working tool assembly includes a drill assembly including a drill support member being securely fastened with said locking pin in said tubular portion of said tool support member, and also including a drill having a motor and a rotatable shaft being disposed through said drill support member, and further including a countersink bit being mounted to an end of said rotatable shaft, and also including a power cord being attached to said motor.

7. A jewelry setting/presetting tool as described in claim 6, wherein said drill support member is a cylindrical block having an annular flange being disposed about a top end thereof.

8. A jewelry setting/presetting tool as described in claim 7, wherein said working tool assembly also includes a setting bit support member being securely fastened with said locking pin in said tubular portion of said tool support member, and also including a shaft being attached to a bottom end of said setting bit support member, and further including a stone setting bit being attached to an end of said shaft for setting a stone in the work-piece.

9. A jewelry setting/presetting tool as described in claim 8, wherein said setting bit support member is a cylindrical block having an annular flange being disposed about a top end thereof.

10. A jewelry setting/presetting tool as described in claim 8, wherein said means of moving said tool support member and said working tool assembly includes a support column being securely mounted upon said board-like mounting bracket, and also includes an axle being rotatably mounted to said support column, and further includes a gear being mounted to said axle for rotation therewith and being engaged to said toothed bar portion of said tool support member, and also includes a lever being mounted to said axle for the rotation of said gear.

11. A jewelry setting/presetting tool as described in claim 10, wherein said support column includes a longitudinal slot disposed in a top end thereof with said axle being journaled through said longitudinal slot and with said gear being rotatably disposed in said longitudinal slot.

\* \* \* \* \*